June 28, 1966  H. E. ASHFIELD  3,258,075
MEANS FOR CONTROLLING TRACTOR-IMPLEMENT COMBINATIONS
Filed Jan. 8, 1963  2 Sheets-Sheet 1

Inventor
Herbert Edward Ashfield
By
Morris & Bateman Attorneys

June 28, 1966  H. E. ASHFIELD  3,258,075
MEANS FOR CONTROLLING TRACTOR-IMPLEMENT COMBINATIONS
Filed Jan. 8, 1963  2 Sheets-Sheet 2

HERBERT EDWARD ASHFIELD

United States Patent Office 3,258,075
Patented June 28, 1966

3,258,075
MEANS FOR CONTROLLING TRACTOR-IMPLEMENT COMBINATIONS
Herbert Edward Ashfield, Huddersfield, England, assignor to David Brown Tractors Limited
Filed Jan. 8, 1963, Ser. No. 250,047
8 Claims. (Cl. 172—316)

The invention relates to new or improved means for controlling tractor-implement combinations, and more particularly to the control, by a tractor, of a semi-trailed agricultural implement hitched to said tractor.

The object of the invention is to provide means whereby, when a semi-trailed plough or the like having a plurality of ground-working tools is lowered into or lifted out of working position, said tools are caused to enter or leave the ground successively to avoid or minimise any "saw tooth" effect at the headlands of a field.

A further object of the invention is to avoid or minimise a disadvantage found when using a semi-trailed frame carrying in series a plurality of implements, for example cultivators, of the kind normally mounted individually on a tractor hitch linkage, namely the impossibility of working right up to the headlands with all but the foremost implement.

According to the invention, a valve for controlling the supply of hydraulic fluid to, and the exhaust of fluid from, means for raising and lowering the rear end of a semi-trailed agricultural implement adapted to be connected to a tractor, to effect a delay between the raising of the front end and the raising of the rear end of the implement and between the lowering of said front end and the lowering of said rear end, is adapted to be actuated automatically by the raising and lowering of the front end of the implement.

A preferred embodiment of the invention will now be described, by way of example only, with reference to the accompanying drawings of which:

Figure 1:
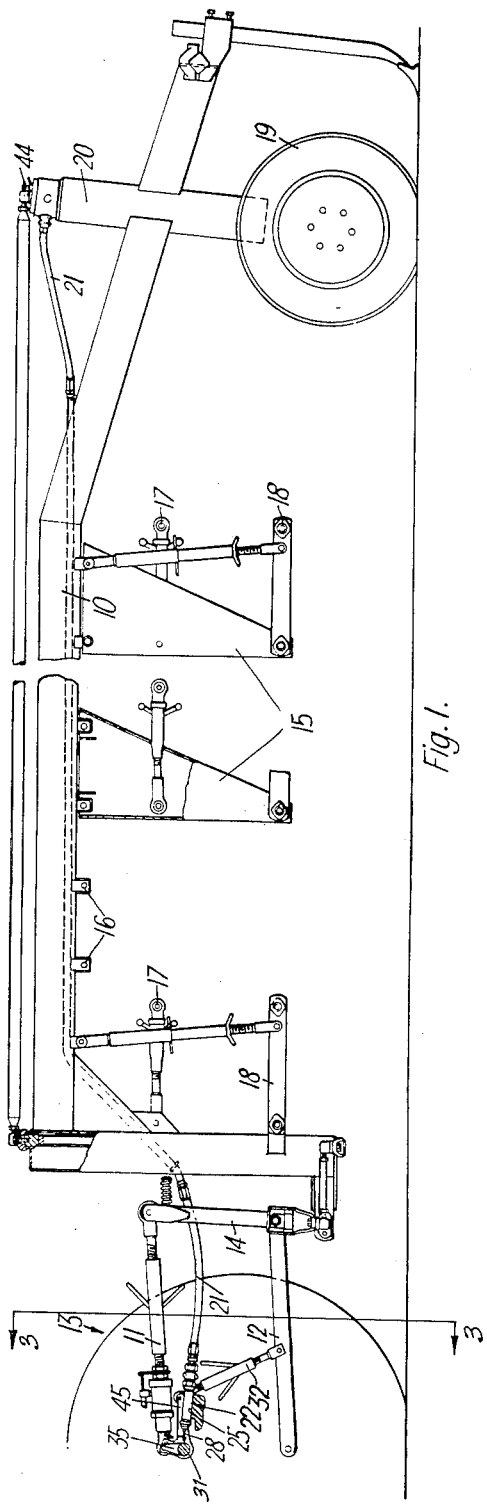
FIG. 1 is a side elevation, with parts omitted for clarity, of a semi-trailed implement-carrying frame connected to the hitch links of a tractor and provided with a valve according to the invention.

Referring now to FIG. 1, a frame 10 is connected to an upper hitch link 11 and two laterally spaced lower hitch links 12 of a tractor indicated generally at 13 by means of a headstock 14 which enables signals proportional to the draft force exerted by the tractor on the frame to be transmitted via the link 11 to a hydraulic power lift mechanism (not shown) on the tractor. The frame 10 carries a number of brackets 15 which are removably secured to lugs 16 on the frame so that the spacing apart of consecutive brackets is adjustable. Each of the brackets 15 carries an upper link 17 and two laterally spaced lower links 18 constituting a three-link hitch on which there can be mounted an implement of the kind normally mounted individually on a tractor hitch linkage. The front end of the frame 10 is also provided with an upper link 17 and a pair of laterally spaced lower links 18 serving the same purpose as the links carried by the brackets 15. The rear end of the frame 10 is supported by a ground-engaging wheel 19 carried by a hydraulic jack 20 which is connected by means of a conduit 21 to a slide valve indicated generally at 22.

Figure 2:
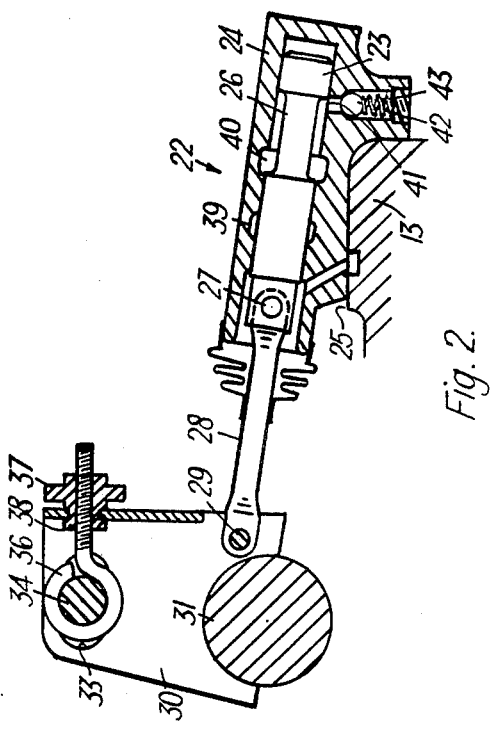
FIG. 2 is a sectional view of the valve on a larger scale.
Figure 3:
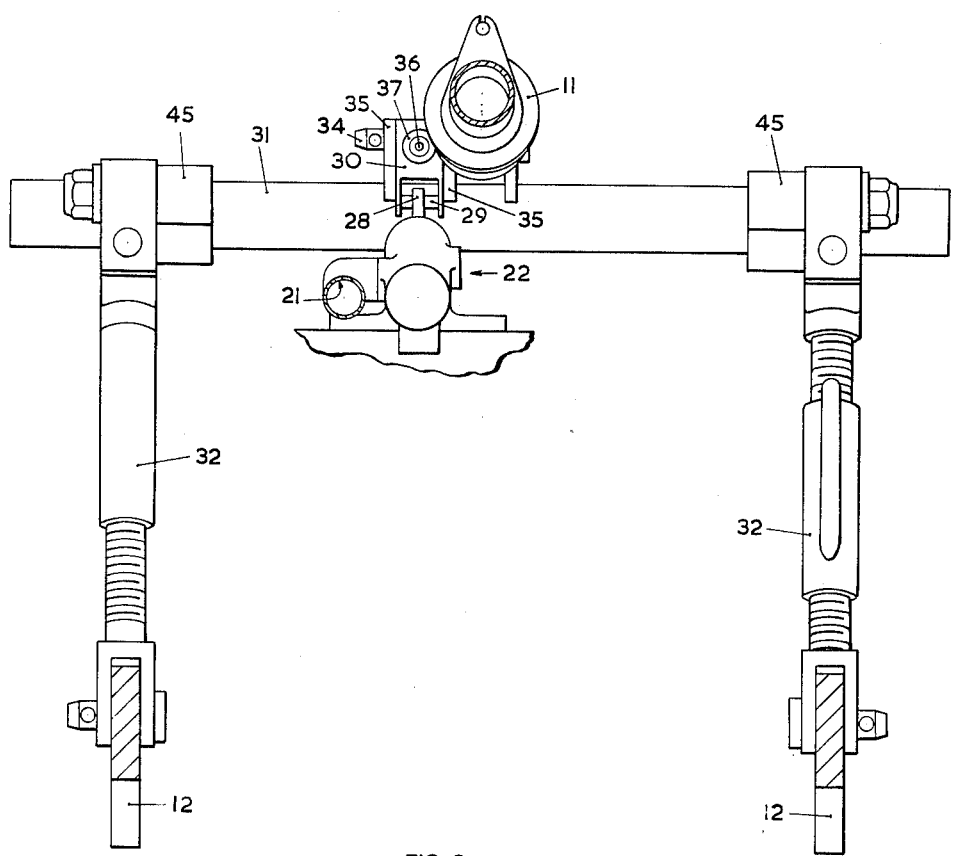
FIGURE 3 is a section substantially on line 3—3 of FIGURE 1 showing the relationship of control parts.

Referring now to FIG. 2, the slide valve 22 comprises a valve spool 89 slidable in a housing 24 secured to a facing 25 on the frame of the tractor 13. The valve spool 23 has a portion 26 of reduced diameter and is pivotally connected by a pin 27 to one end of a rod 28 the other end of which is pivotally connected to a crank pin 29 secured to a bracket 30. Said bracket is shaped at its lower end to engage rotatably on the periphery of a rockshaft 31 journalled in the tractor frame and adapted to be rocked about its axis by a hydraulic jack (not shown) forming part of the hydraulic power lift mechanism on the tractor 13. The rockshaft 31 is connected to the links 12 by lift arms 45 and lift rods 32 so as to be capable of raising and lowering said links pivotally. In the upper end of the bracket 30 there is formed an arcuate slot 33 through which passes a pin 34 secured between two lugs 35 (see FIG. 1) fixed on the rockshaft 31. An eyebolt 36 encircles the pin 34 and the threaded portion of said bolt engages in a nut 37 which is axially fixed but freely rotatable relative to the bracket 30 due to the provision of a retaining flange 38 on said nut. Thus rotation of the nut adjusts the angular position of the crank pin 29 relative to the rockshaft 31. In the bore of the housing 24 there are formed two annular grooves 39 and 40. The groove 39 is connected to a conduit (not shown) through which oil is supplied by the hydraulic power lift mechanism to the hydraulic jack for rocking the rockshaft 31, and the groove 40 is connected to the conduit 21. A port 41 leading to sump from the bore of the housing 24 contains a ball 42 loaded by a very light spring 43 so as to maintain sufficient pressure, say 5 lbs. per square inch, in the hydraulic jack 20 and the conduit 21 to prevent the entry of air. The construction of the valve 22 is such that in one position of its spool 23, oil under pressure flows from the hydraulic power lift mechanism to the hydraulic cylinder 20 via the groove 39, the space surrounding the portion 26 of the valve spool, the groove 40 and the conduit 21, whilst in another position of said spool, shown in FIG. 2, the hydraulic cylinder 20 is disconnected from the supply of oil under pressure, and oil contained within said cylinder can flow to sump via the conduit 21, the groove 40, the bore of the housing 24, and the port 41. An adjustable stop 44 limits movement of the hydraulic jack 20 in the lowering direction so as to determine the height of the rear end of the frame when in working position.

In operation, when a number of implements carried by the frame 10 are in work, the height of the front end of the frame relative to the surface of the ground is controlled automatically by the hydraulic power lift mechanism of the tractor in accordance with the draft force exerted by the tractor on the frame. The height of the rear end of the frame, however, is determined by the setting of the adjustable stop 44 associated with the hydraulic jack 20, said jack communicating with sump due to the valve spool 23 being in the position shown in FIG. 2.

When the tractor driver wishes to raise the implements carried by the frame 10 out of work, for example on reaching a headland, he operates the tractor hydraulic power lift mechanism in normal manner to rock the rockshaft 31 so as to raise pivotally the links 12. The front end of the frame 10 thereupon commences to lift, and at the same time the rocking of the rockshaft 31, acting through the rod 28, commences to move the valve spool 23 to the left as viewed in FIG. 2. The angular setting of the crank pin 29 relative to the rockshaft 31 determines how far the front end of the frame is lifted before movement of the valve spool 23 blanks off the port 41 from the annular groove 40 and opens a path for the flow of oil under pressure between said groove and the annular groove 39. When this occurs, said oil flows via the valve 22 from the hydraulic power lift mechanism to the hydraulic jack 20 to lift the rear end of the frame 10, and upward movement of the front end of the frame ceases due to the fact that the pressure of oil required to actuate the hydraulic jack 20 is designed to be less than that required to raise pivotally the links 12 supporting the front end of the frame. Thus the rear end of the frame 10 is fully lifted before the front end can complete its upward movement. When the pressure of oil within the fully extended hydraulic jack 20 rises to the pressure required to lift the front end of the frame 10, said front end recommences and completes its upward movement. The angular setting of the crank pin 29 relative to the rockshaft 31 is so adjusted that at the tractor speed employed the delay between the front end of the frame 10 commencing to lift and the rear end thereof commencing to lift is such as to cause all the implements to be lifted out of the ground at the same distance from the edge of the field.

As soon as the links 12 have finally attained their fully raised position, the supply of oil under pressure from the hydraulic power lift mechanism is discontinued by conventional automatic or manual control means (not shown) and the oil supporting the frame 10 is locked within the hydraulic jack on the tractor 13 and the hydraulic jack 20, said jacks remaining in communication with one another due to the rockshaft 31 holding the valve spool 23 in the position in which the grooves 39 and 40 communicate with one another.

To lower the implement into working position once again, the tractor driver operates the hydraulic power lift mechanism in normal manner to lower pivotally the links 12. This puts both the hydraulic jack of the tractor 13 and the hydraulic jack 20 in communication with sump via one and the same flow path, that is to say the jack 20 temporarily communicates with sump via the conduit conducting the hydraulic power lift mechanism to the hydraulic jack on the tractor, and not via the port 41. However, since the pressure of oil required to sustain the front end of the frame 10 in raised position is greater than that required to sustain the rear end thereof in raised position, said front end commences to lower first. During the first few degrees of rocking movement of the rockshaft 31 as the front end of the frame 10 leaves its fully raised position, the valve spool 23 is automatically caused to interrupt the hydraulic connection between the grooves 39 and 40 and thus between the hydraulic jack on the tractor 13 and the hydraulic jack 20. The hydraulic jack on the tractor remains in communication with sump and thus the front end of the frame 10 can continue to lower. Subsequently, as the front end of the frame 10 nears its fully lowered position, the valve spool 23 opens the flow path between the groove 40 and the port 41 so that the hydraulic jack 20 is connected to sump via said port. Thus the rear end of the frame 10 is permitted to lower. When the implements carried by the frame 10 are in work, and variations in pressure are caused to occur in the hydraulic jack on the tractor 13 to vary the height of the front end of the frame in response to signals transmitted automatically to the hydraulic power lift mechanism as a result of variations in draft force, the hydraulic jack 20 continues to communicate with sump via the port 41 and the height of the rear end of the frame 10 relative to the surface of the ground does not vary until such time as the frame is deliberately lifted into its fully raised position.

The invention is applicable not only to the control of a semi-trailed frame for carrying in series a plurality of implements of the kind normally mounted individually on a tractor hitch linkage, but to any semi-trailed implement, for example a plough, having a longitudinally extending series of ground-working tools. It will be understood that the valve controlling the hydraulic jack on the implement can be of any convenient type, for example a rotary valve actuated by the tractor rockshaft. Furthermore, the valve controlling the hydraulic jack on the implement need not necessarily be mounted on the tractor frame, but may be mounted on the implement, and need not necessarily be actuated by the rocking of the tractor rockshaft, but may be actuated in any other convenient way by relative movement of parts of the tractor and/or of the implement due to the raising and lowering of the front end of the implement.

What I claim is:

1. For combination with lift means having a rotatably mounted rockshaft, a tractor provided with hitch links connected to said rockshaft and the front of a semi-trailed implement and a hydraulic system connected to said rockshaft for rotating said rockshaft and thereby actuating said links to change the height of the front end of said implement, hydraulic means for raising and lowering the rear end of said implement, a valve mounted on said tractor and being contained in said hydraulic system for controlling the actuation of said hydraulic means, a rod mechanically connected to said valve to actuate said valve, a bracket movably mounted about the axis of said rockshaft and pivotally connected to said rod for shifting said valve to sequentially actuate said hydraulic means to correspondingly change the height of the rear end of said implement, a crank pin fixed to rotate with said rockshaft, and an adjustable member connecting said crank pin and said bracket.

2. In combination with a tractor provided with lift means connected to the front of a semi-trailed implement and a hydraulic system for actuating said lift means to change the height of the front end of said implement, hydraulic means for raising and lowering the rear end of said implement, a valve mounted on said tractor and having internal chamber means connected to said system and containing a slidable valve spool connected to an actuator rod, a conduit connecting said hydraulic means to said chamber means, a member rockably mounted on said tractor and pivotally connected to said rod, and means connecting said member to said lift means to be moved by a change in height of the front end of said implement, whereby in response to a change in height of the front of said implement said spool is moved between a position where said hydraulic system is in fluid communication with said hydraulic means through said chamber means and another position where said fluid communication is blocked.

3. Apparatus for controlling the raising and lowering of an implement assembly having its front end connected by hitch linkage to a tractor having a hydraulic fluid pressure system, a hydraulic jack at the rear end of said implement assembly, a valve having three spaced ports connected respectively to said hydraulic system, to said jack and to a sump, said valve further including a slidable valve element for establishing fluid communication either between the two ports connected respectively to said hydraulic system and to said jack or between the two ports connected respectively to said jack and to said sump, means for operating said hitch linkage to raise or lower the front end of said implement assembly comprising a rockshaft powered from said hydraulic system and motion transmitting means pivotally connecting said rockshaft to said valve element for actuating said valve element to operably connect said hydraulic system to said jack to correspondingly change the height of said rear end after a predetermined change in the height of said front end.

4. In the apparatus defined in claim 3, said motion transmitting means comprising a lever rockable about the axis of said rockshaft and eccentrically connected thereto, and a rod pivotally connected to said element and pivotally connected to said lever eccentrically of said rockshaft.

5. For combination with a tractor having lift means connected to the front end of a semi-trailed implement and a hydraulic system having a source of hydraulic fluid for selectively actuating said lift means to change the height of the front end of said implement, hydraulic means connected in said system for actuation by fluid from said source for changing the height of the rear end of said implement, a valve contained in said system and having a valve member displaceable between spaced positions for controlling fluid communication between said source and said hydraulic means, and means mechanically connecting said valve member to said lift means for unitary displacement therewith to position said valve member for establishing fluid communication between said source and said hydraulic means for actuating said hydraulic means to change the height of said rear end after a predetermined change in the height of said front end.

6. The combination defined in claim 5 wherein said lift means comprises a rockshaft rotatably mounted on said tractor, hitch linkage means operably connected to said rockshaft and to said front end to change the height of said front end upon rotation of said rockshaft, and power means actuated by hydraulic fluid from said source for rotating said rockshaft.

7. The combination defined in claim 6 wherein said valve member is mechanically connected to said rockshaft by an adjustable motion transmitting connection.

8. The combination defined in claim 7 wherein said adjustable motion transmitting connection comprises a bracket mounted for rocking movement about the axis of said rockshaft, a valve rod pivotally connected to said bracket, a pin member mounted on said bracket, and means on said rockshaft engaging said pin member to cause said bracket to be rocked with rotation of said rockshaft and to displace said valve member between said spaced positions through the connection provided by said bracket and said valve rod.

References Cited by the Examiner
UNITED STATES PATENTS

| | | | |
|---|---|---|---|
| Re. 24,006 | 5/1955 | Acton | 172—316 |
| 2,777,375 | 1/1957 | Carlin et al. | 172—316 |
| 2,887,166 | 5/1959 | Vogelaar | 172—444 |
| 2,974,733 | 1/1961 | Fletcher | 172—315 X |
| 3,035,645 | 5/1962 | Wilson et al. | 172—445 |
| 3,059,706 | 10/1962 | Morkoski et al. | 172—445 |

ABRAHAM G. STONE, *Primary Examiner.*

CARL W. ROBINSON, *Examiner.*

W. A. SMITH, III, *Assistant Examiner.*